United States Patent
Bonner et al.

(10) Patent No.: US 10,246,198 B2
(45) Date of Patent: Apr. 2, 2019

(54) ALIGNMENT SYSTEM FOR EXHAUST INSTALLATION

(71) Applicant: United Technologies Corporation, Hartford, CT (US)

(72) Inventors: Brett Colin Bonner, San Diego, CA (US); Eric Andrew Nager, El Cajon, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 387 days.

(21) Appl. No.: 15/026,555

(22) PCT Filed: Aug. 29, 2014

(86) PCT No.: PCT/US2014/053419
§ 371 (c)(1),
(2) Date: Mar. 31, 2016

(87) PCT Pub. No.: WO2015/050652
PCT Pub. Date: Apr. 9, 2015

(65) Prior Publication Data
US 2016/0244178 A1     Aug. 25, 2016

Related U.S. Application Data

(60) Provisional application No. 61/885,341, filed on Oct. 1, 2013.

(51) Int. Cl.
*F01D 25/28* (2006.01)
*F01D 25/30* (2006.01)
(Continued)

(52) U.S. Cl.
CPC ............. *B64D 33/04* (2013.01); *B64D 41/00* (2013.01); *F01D 25/28* (2013.01); *F01D 25/30* (2013.01);
(Continued)

(58) Field of Classification Search
CPC . F01D 25/28; F01D 25/30; F02C 7/20; B64D 33/04; B64D 31/00;
(Continued)

(56) References Cited

U.S. PATENT DOCUMENTS 6,039,287 A * 3/2000 Liston .................... B64D 29/00
244/120
7,950,236 B2   5/2011 Durocher et al.
(Continued)

FOREIGN PATENT DOCUMENTS

EP     1995415 A1    11/2008
WO  2009083066 A1    7/2009

OTHER PUBLICATIONS

European Search Report for Application No. EP 14 85 0274, dated Apr. 26, 2007.
International Search Report for International Application No. PCT/US2014/053419, dated Dec. 17, 2014.
Written Opinion for International Application No. PCT/US2014/053419, dated Dec. 17, 2014.

*Primary Examiner* — Igor Kershteyn
(74) *Attorney, Agent, or Firm* — Cantor Colburn LLP

(57) ABSTRACT

An exhaust system for an aircraft includes an exhaust duct configured to be inserted within a plurality of leaf springs of an aircraft. The exhaust duct is configured to be in fluid communication with the auxiliary power unit for conveying exhaust from the auxiliary power unit to an exhaust exit, the exhaust duct including at least one exhaust bracket for movably mounting the exhaust duct to an airframe. An alignment system is configured to be operatively connected to the exhaust duct.

12 Claims, 3 Drawing Sheets

(51) Int. Cl.
*B64D 33/04* (2006.01)
*B64D 41/00* (2006.01)
*F02C 7/20* (2006.01)
*F02K 1/04* (2006.01)

(52) U.S. Cl.
CPC .................. *F02C 7/20* (2013.01); *F02K 1/04* (2013.01); *B64D 2041/002* (2013.01); *F05D 2220/50* (2013.01); *F05D 2230/60* (2013.01); *F05D 2230/644* (2013.01); *F05D 2250/241* (2013.01); *F05D 2250/711* (2013.01); *F05D 2250/712* (2013.01); *F05D 2260/30* (2013.01)

(58) Field of Classification Search
CPC ........... B64D 2041/002; F05D 2220/60; F05D 2230/60; F05D 2230/644; F05D 2250/241; F05D 2250/711; F05D 2250/712; F05D 2260/30
See application file for complete search history.

(56) References Cited

U.S. PATENT DOCUMENTS

| | | | |
|---|---|---|---|
| 2002/0084381 A1* | 7/2002 | Lemire | B64D 41/00 244/54 |
| 2002/0139120 A1* | 10/2002 | Sheoran | B64D 33/06 60/772 |
| 2006/0060417 A1 | 3/2006 | Williams | |
| 2006/0180388 A1* | 8/2006 | Brown | B64D 41/00 181/250 |
| 2006/0207827 A1* | 9/2006 | Williams | B64D 41/00 181/227 |
| 2008/0078863 A1 | 4/2008 | Lwasa et al. | |
| 2008/0236939 A1 | 10/2008 | Napier et al. | |
| 2009/0188258 A1 | 7/2009 | Rizkalla et al. | |
| 2010/0229569 A1 | 9/2010 | Hollimon et al. | |

* cited by examiner

ALIGNMENT SYSTEM FOR EXHAUST INSTALLATION

RELATED APPLICATIONS

This application claims the benefit of and priority to U.S. Provisional Patent Application No. 61/885,341 filed Oct. 1, 2013, the contents of which are incorporated herein by reference in their entirety.

BACKGROUND OF THE INVENTION

1. Field of the Invention

The present disclosure relates to exhaust system installation, and more particularly to installation of exhaust systems in gas turbine engines, for example 2. Description of Related Art In certain applications of aircraft exhaust systems, an exhaust duct is attached to structural elements of the aircraft. The exhaust system serves to receive exhaust gas from the engine and to pass the exhaust gas therethrough to an exhaust exit. During installation of the exhaust system unintended stress and preloading causes premature failure of the components.

Generally, the aft end of the exhaust is inserted and secured to a semi-rigid support on the aircraft. The front end of the exhaust duct is then bolted with exhaust brackets to the aircraft frame. Due to general variations in the exhaust, the structure of the aircraft and the semi-rigid nature of the aft support, securing of the forward bolts bends the exhaust duct which in turn creates stress and preloading.

Such conventional methods and systems have generally been considered satisfactory for their intended purpose. However, there is still a need in the art for improved systems and methods for installing exhaust systems. There also remains a need in the art for such systems and methods that are easy to make and use. The present disclosure provides a solution for these problems.

SUMMARY OF THE INVENTION

An exhaust system for an aircraft includes an exhaust duct configured to be in fluid communication with an auxiliary power unit for conveying exhaust from the auxiliary power unit to an exhaust exit. The exhaust duct includes at least one exhaust bracket for movably mounting the exhaust duct to an airframe.

In certain embodiments an alignment system includes at least one tapered shim adjacent the exhaust duct for accommodating a gap between the at least one exhaust bracket and the airframe. The alignment system can include at least one convex washer disposed between the at least one exhaust bracket and the tapered shim. The alignment system can also include at least one concave washer disposed between the at least one exhaust bracket and the tapered shim.

In certain embodiments the alignment system can include at least one convex washer disposed on a side of the at least one exhaust bracket opposite the tapered shim. The alignment system can also include at least one concave washer disposed on a side of the at least one exhaust bracket opposite the tapered shim.

The alignment system can include at least one convex washer and at least one concave washer disposed between at least one exhaust bracket and the tapered shim. The alignment system can also include at least one convex washer and at least one concave washer disposed on a side of the at least one exhaust bracket opposite the tapered shim.

A method for aligning an aircraft exhaust system includes inserting the exhaust duct of an exhaust system as described above into a plurality of leaf springs of a tail cone. The method also includes identifying at least one gap between at least one of the exhaust brackets and the aircraft frame and operatively connecting an alignment system to the exhaust duct to secure the exhaust bracket to the aircraft frame across the at least one gap.

The step of inserting the exhaust duct can include attaching the exhaust duct at a first attachment point. The step of connecting can include inserting a tapered shim into the at least one gap. In certain embodiments, the step of connecting can include disposing at least one convex and at least one concave washer between the at least one exhaust bracket and tapered shim. The step of connecting can include disposing at least one convex and at least one concave washer on a side of at the least one exhaust bracket opposite the tapered shim. The method can further include bolting the tapered shim to the aircraft frame.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 2:
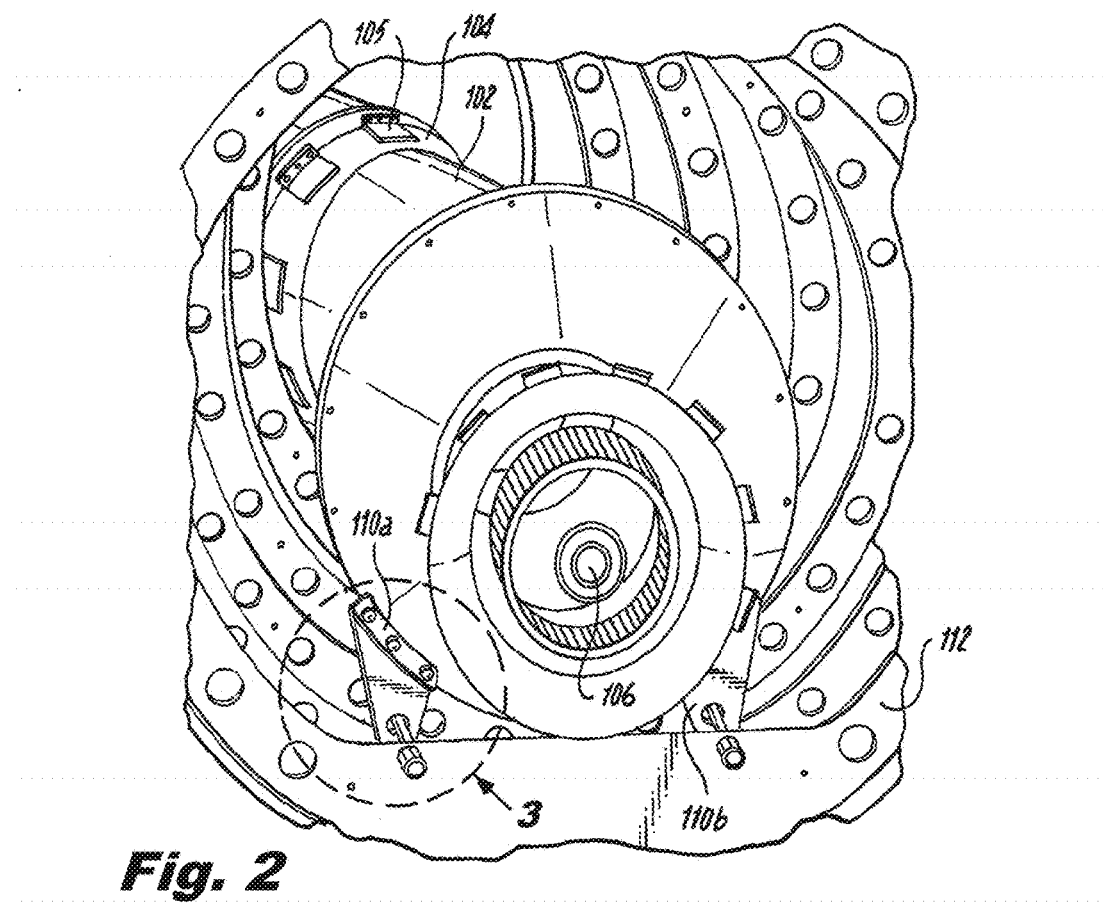
FIG. 2 is a front view of the exhaust system of FIG. 1, showing the exhaust brackets aligned with an aircraft.

Reference will now be made to the drawings wherein like reference numerals identify similar structural features or aspects of the subject disclosure. For purposes of explanation and illustration, and not limitation, a partial view of an embodiment of the exhaust system in accordance with the disclosure is shown in FIG. 2 and is designated generally by reference character 100. Other embodiments of the exhaust system with an alignment system in accordance with the disclosure, or aspects thereof, are provided in FIG. 2, as will be described.

Figure 1:
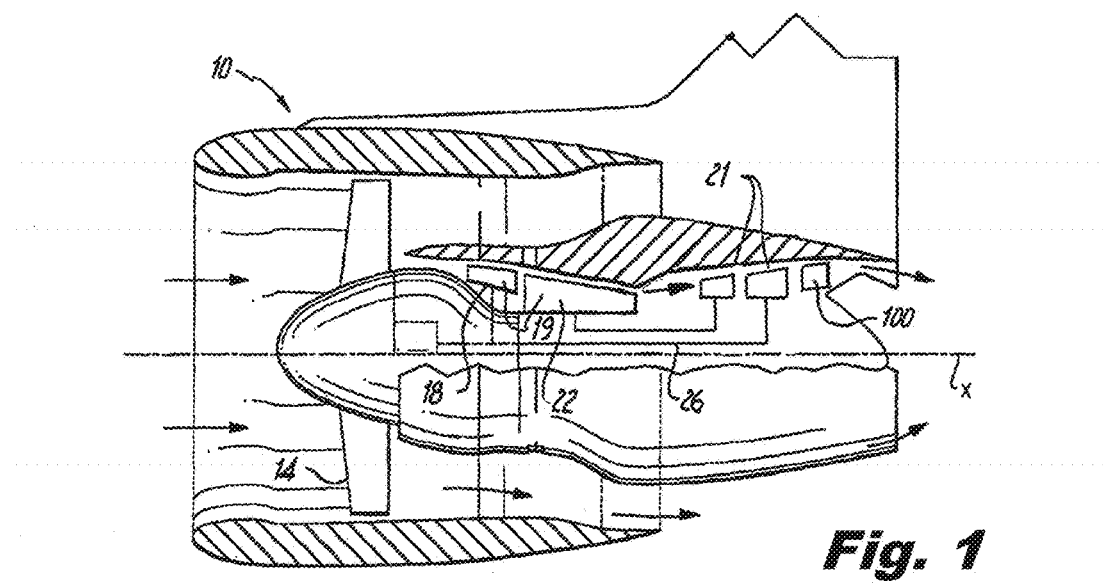
FIG. 1 is a schematic sectional view of an embodiment of a gas turbine engine in accordance with the present disclosure, showing the location of an exhaust system.

FIG. 1 schematically illustrates an example gas turbine engine 10 including (in serial flow communication) a compressor 19, a combustor 26, and a turbine 21. The gas turbine engine 10 is circumferentially disposed about an engine centerline X. During operation, air is pulled into the gas turbine engine 10 and pressurized by the compressor 19 mixed with fuel, and burned in the combustor 26. Hot combustion gases generated within the combustor 26 flow through turbine 21, which extracts energy from the hot combustion gases, and then out of gas turbine engine 10 through exhaust system 100. Gas turbine engine 10 is shown in FIG. 1 as an auxiliary power unit (APU) in the tail of an aircraft according to an embodiment.

Generally, during installation of the exhaust system 100 into the aircraft, and due to variations in parts and the aircraft structure, the primary exhaust duct 102 is forcefully secured. The forceful nature of the installation causes damage to the semi-rigid aft support and creates preloading in the exhaust duct and aircraft structure which may lead to premature failure of the components. As shown in FIG. 2, during installation, the exhaust duct 102 is secured at a first attachment point 105 in the rear about a tail cone 104. The exhaust duct 102 is in fluid communication with the tail cone 104 for conveying exhaust from the turbine 21 to the exhaust exit. The exhaust duct 102 includes two exhaust brackets 110a, 110b for movably mounting the exhaust duct 102 to the airframe 112. Preferably, the exhaust brackets 110a, 110b are secured to the airframe 112 such that they remain perpendicular to the tail cone 104. However, in most instances, gaps 120a, 120b exist between the exhaust brackets 110a, 110b and airframe 112 (see, e.g., FIG. 4). In order to secure the two exhaust brackets 110a, 110b, the exhaust duct 102 is forceably moved laterally to accommodate for the gaps 120a, 120b which causes stress on the exhaust duct 102 during installation.

Figure 3:
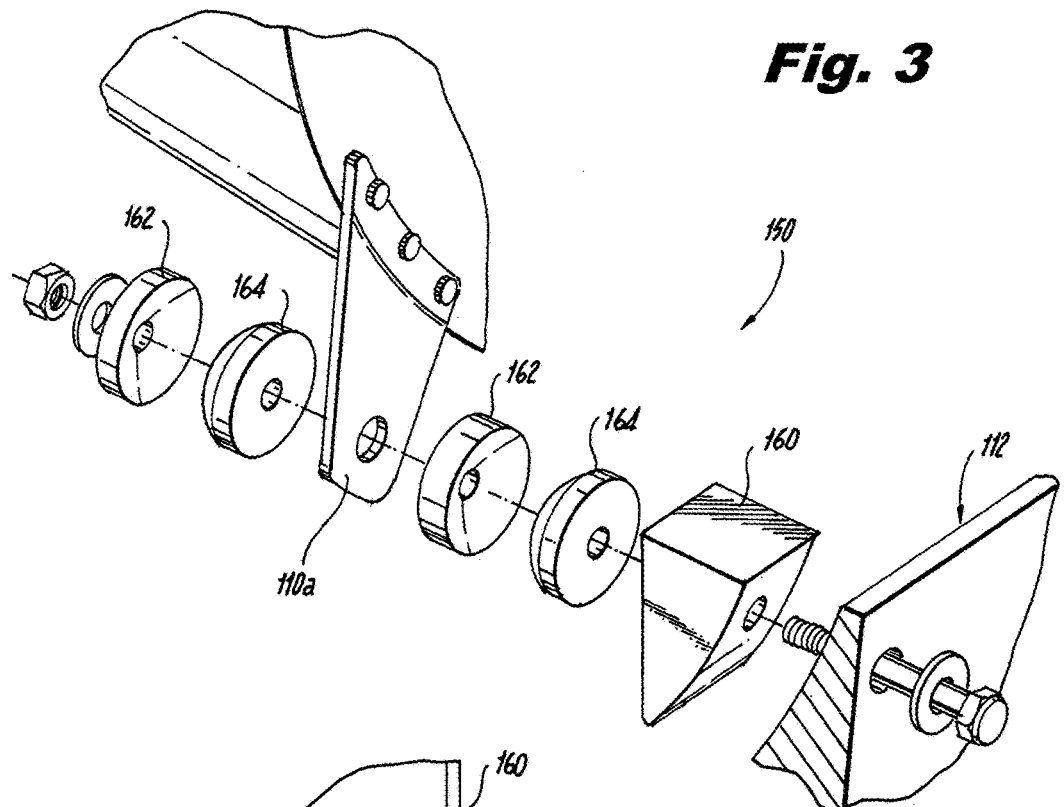
FIG. 3 is side elevation view of the exhaust system of FIG. 1, showing an alignment system constructed in accordance with the present disclosure.

FIG. 3 shows an embodiment of the present disclosure with an alignment system 150 to accommodate for the gaps 120a, 120b between the exhaust brackets 110a, 110b and the aircraft frame 112. The exhaust duct 102 is inserted into a plurality of leaf springs of the tail cone 104 and secured at a first attachment point 105. As shown, the exhaust brackets 110a, 110b are misaligned with the aircraft frame and gaps 120a, 120b between the exhaust brackets 110a, 110b and aircraft frame 112 prevent securing the exhaust brackets 110a, 110b as needed.

Figure 4:
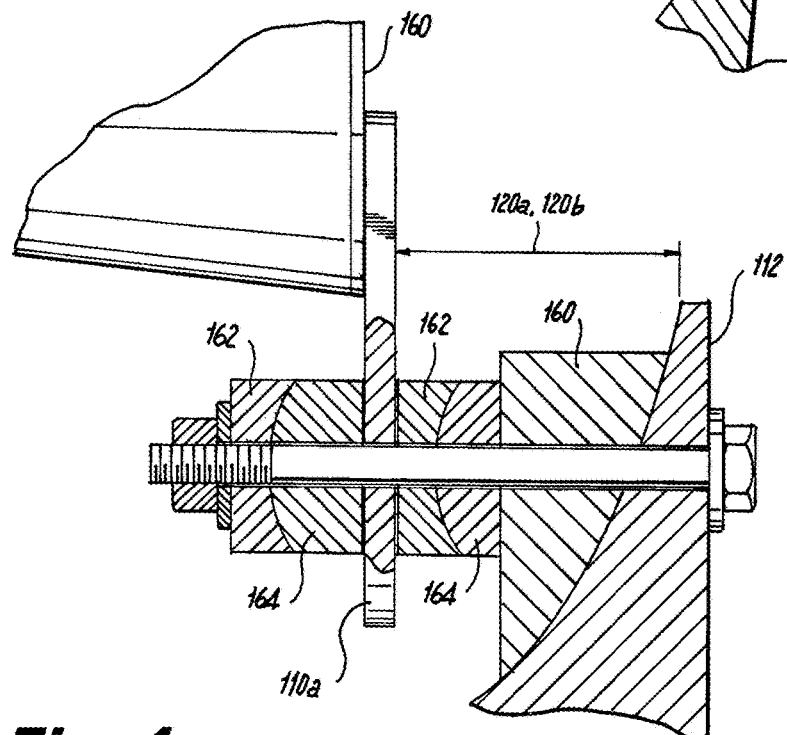
FIG. 4 is a side elevation view of a portion of the alignment system of FIG. 3.

FIG. 4 shows a detailed view of the alignment system 150 accommodating for gap 120a. At least one tapered shim 160 is positioned adjacent the aircraft frame 112. It will be understood by those in the art that the angle of the gaps may vary with each installation and therefore the dimensions of the tapered shim 160 will vary as needed. As shown in FIG. 4, at least one tapered shim 160 is used for each exhaust bracket however it will be understood that various combinations of multiple tapered shims for one or both exhaust brackets may be used. In an embodiment, the holes through aircraft frame 112, tapered shim 160, and exhaust brackets 110a, 110b are slotted, i.e., elongated, to allow adjustability when securing system 150 with bolt 170 as described below.

At least one convex washer 162 and concave washer 164 may be positioned between the tapered shim 160 and the exhaust bracket 110a. The convex and concave washers 162, 164 help to distribute the load between the exhaust bracket 110a and the aircraft frame 112. Also, the structure of the washers 162, 164 help to completely fill the gap 120a, 120b so that there is no unintended movement between the exhaust bracket 110a and the aircraft frame 112 when in use. Additionally, at least one convex and concave washer 162, 164 may be positioned on an opposite side of the exhaust bracket 110a. The additional washers 162, 164 can further help distribute the load as needed. It will be understood that the amount of convex and concave washers 162, 164 may vary to accommodate the gap and load of the exhaust duct. Once the tapered shim 160 and series of convex and concave washers 162, 164 are positioned to accommodate for the gap 120a, a bolt 170 may be used to secure the features of the alignment system 150 to the aircraft frame 112.

Figure 5:
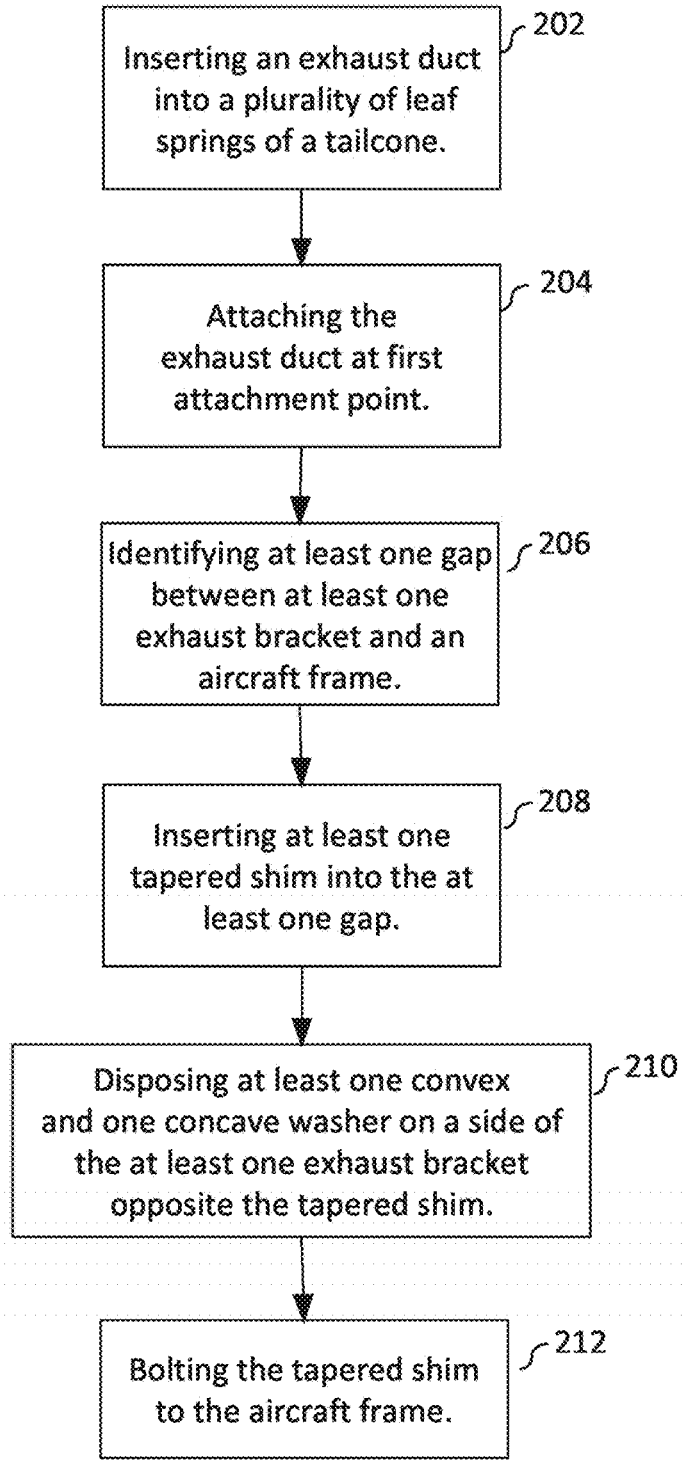
FIG. 5 is a method of aligning an aircraft exhaust system constructed in accordance with the present disclosure.

A method 200 for aligning an aircraft exhaust system, e.g., exhaust system 100, is shown in FIG. 5. First, at block 202, an exhaust duct, e.g., exhaust duct 102, of an exhaust system is inserted into a plurality of leaf springs, e.g., leaf springs, of a tail cone, e.g., tail cone 104, of the aircraft. Next, at block 204, the exhaust duct is then attached at a first attachment point, e.g., attachment point 105, to the aircraft. At block 206, at least one gap, e.g., gap 120a, is identified between at least one exhaust bracket, e.g., exhaust bracket 110a, and the aircraft frame, e.g, aircraft frame 110a. Once the gap is identified, at least one tapered shim, e.g., tapered shim 160, is positioned adjacent the aircraft frame to accommodate the dimensions of the gap at block 208. A plurality of convex and concave washers, e.g., washers 162, 164, may then be positioned on either side of the exhaust bracket, as needed, at block 210. Finally at block 212, a bolt, e.g., bolt 170, is used to secure the alignment system between the exhaust bracket and the airframe.

Those skilled in the art will readily appreciate that the forward and aft orientation is exemplary only and the orientation can be reversed without departing from the scope of the disclosure.

The methods and systems of the present disclosure, as described above and shown in the drawings, provide for an alignment system for an exhaust system installation with superior properties including accommodating gaps between the exhaust and the aircraft. While the apparatus and method of the subject disclosure have been shown and described with reference to preferred embodiments, those skilled in the art will readily appreciate that changes and/or modifications may be made thereto without departing from the spirit and scope of the subject disclosure.

What is claimed is:

1. An exhaust system for an aircraft comprising:
an exhaust duct configured to be in fluid communication with an auxiliary power unit for conveying exhaust from the auxiliary power unit to an exhaust exit, the exhaust duct including at least two exhaust brackets for movably mounting the exhaust duct to an airframe; and
an alignment system configured to be operatively connected to the exhaust duct, wherein the alignment system includes, disposed between each exhaust bracket and the aircraft frame, at least one tapered shim adjacent the exhaust duct for accommodating a gap between the at least one exhaust bracket and the airframe.

2. The exhaust system as recited in claim 1, wherein the alignment system includes at least one convex washer disposed between each exhaust bracket and the associated tapered shim.

3. The exhaust system as recited in claim 1, wherein the alignment system includes at least one concave washer disposed between each exhaust bracket and the associated tapered shim.

4. The exhaust system as recited in claim 1, wherein the alignment system includes at least one convex washer disposed on a side of each exhaust bracket opposite the associated tapered shim.

5. The exhaust system as recited in claim 1, wherein the alignment system includes at least one concave washer disposed on a side of each exhaust bracket opposite the tapered shim.

6. The exhaust system as recited in claim 1, wherein the alignment system includes at least one convex washer and at least one concave washer engaged together and disposed between each exhaust bracket and the tapered shim.

7. The exhaust system as recited in claim 1, wherein the alignment system includes at least one convex washer and at least one concave washer engaged together and disposed on a side of each exhaust bracket opposite the tapered shim.

8. A method for aligning an aircraft exhaust system, the steps comprising:
   inserting an exhaust duct into a plurality of leaf springs of a tail cone;
   identifying a gap between each of two exhaust brackets and an aircraft frame;
   operatively connecting an alignment system to the exhaust duct to secure each exhaust bracket to the aircraft frame across the each gap; and
   wherein the step of connecting includes inserting a tapered shim into each gap.

9. The method as recited in claim 8, wherein the step on inserting the exhaust duct includes attaching the exhaust duct at a first attachment point.

10. The method as recited in claim 9, wherein the step of connecting includes disposing at least one convex and at least one concave washer between each exhaust bracket and the tapered shim.

11. The method as recited in claim 9, wherein the step of connecting includes disposing at least one convex and at least one concave washer on a side of each exhaust bracket opposite the tapered shim.

12. The method as recited in claim 9, further comprising bolting the tapered shim to the aircraft frame.

\* \* \* \* \*